W. W. ROBERTS.
HEATING AND COOKING APPARATUS.
APPLICATION FILED DEC. 22, 1915.
1,205,665.
Patented Nov. 21, 1916.
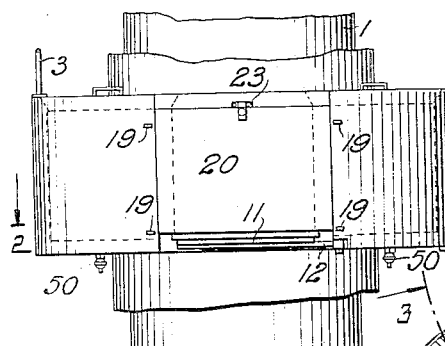
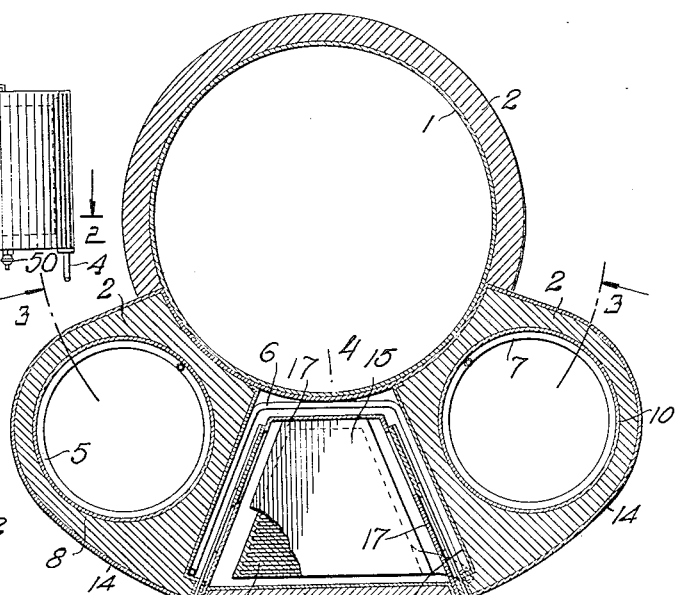
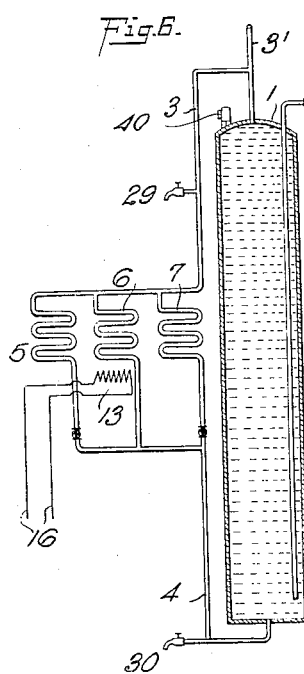
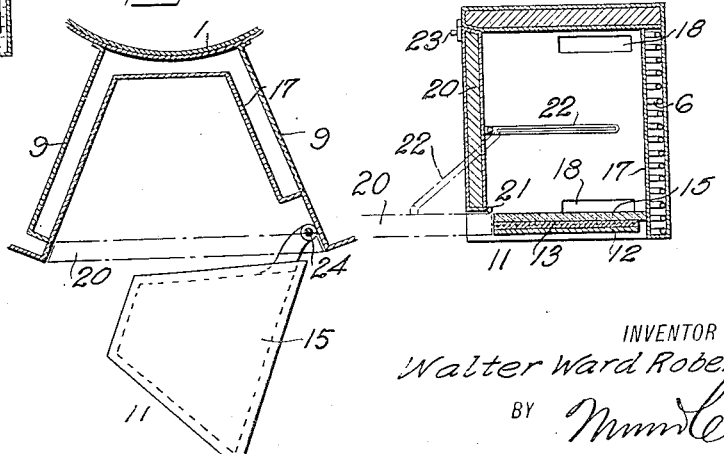
WITNESSES
George L. Blume.
INVENTOR
Walter Ward Roberts
BY
ATTORNEYS

UNITED STATES PATENT OFFICE.

WALTER WARD ROBERTS, OF SEATTLE, WASHINGTON.

HEATING AND COOKING APPARATUS.

1,205,665.   Specification of Letters Patent.   Patented Nov. 21, 1916.

Application filed December 22, 1915. Serial No. 68,184.

*To all whom it may concern:*

Be it known that I, WALTER WARD ROBERTS, a citizen of the United States, and a resident of Seattle, in the county of King and State of Washington, have invented a new and Improved Heating and Cooking Apparatus, of which the following is a full, clear, and exact description.

The invention relates to cooking apparatus on the fireless cooking principle, and one object is to provide a new and improved heating and cooking device arranged to permit of carrying on a number of cooking operations at the same time and with the use of but a single heating element, or to carry on such operations at the time the heating element is not in use.

Another object of the invention is to utilize the heat energy to the fullest advantage for direct cooking, or indirect cooking on the fireless cooking principle, or both direct and indirect at the same time, as desired by the user.

In order to accomplish the desired result, use is made of a reservoir connected with a source of liquid supply, an oven provided with a heating element, a fireless cooker, and heating coils in the said oven and the said fireless cooker and connected with the said reservoir to circulate the liquid through the coils.

Figure 1 is a side elevation of the heating and cooking apparatus; Fig. 2 is an enlarged sectional plan view of the same on the line 2—2 of Fig. 1; Fig. 3 represents a sectional side elevation of the same on the line 3—3 in Fig. 2; Fig. 4 is a cross section of the same on the line 4—4 of Fig. 2; Fig. 5 is a sectional plan view of the oven chamber with the door supporting the heat element in open position; and Fig. 6 is a diagrammatic view of the heating and cooking apparatus.

As shown in the drawings, the device as a whole is made up of a cylindrical reservoir or tank 1, made of iron or other suitable material, and provided with lagging 2, which can be any one of the many approved laggings used in conserving heat. Cooking chambers 8, 9 and 10 are preferably arranged peripherally about the reservoir 1. The middle chamber 9 which also constitutes an oven chamber is arranged in as close proximity as possible to the reservoir 1, whereas the cooking chambers 8 and 10 flank the oven chamber 9 and are spaced from the reservoir by means of lagging 2, similar to that employed in connection with the reservoir 1.

In Fig. 2 I have shown a covering casing, such as 14 which is serviceable in protecting the units 8, 9 and 10 from mechanical abrasion. Any suitable material, however, can be employed, whether metallic or otherwise.

It will be seen from Fig. 3 that chambers 8 and 10 are provided with covers 27 and 28, whereas the central or oven chamber 9 is permanently closed on top, but is provided at the front with a perpendicular oven door 20 hinged at its lower end at 21 to the casing 14, to permit the user of swinging it into the horizontal position indicated by dotted lines in Fig. 4 and moreover in this latter position is constrained to take up the horizontal position by means of a sliding link or catch device 22. At the top of the oven door there is arranged a locking and unlocking device 23, which latter can be of any well known type to allow of unlocking and opening the door 20 in order that easy access may be had to the interior of the oven chamber without difficulty. The covers 27 and 28, as well as the oven door 20 are provided with lagging similar to the lagging used about the reservoir 1. Since the mechanical construction of fireless cooking chambers is well known in the art, further detail description of these individual parts need not be gone into.

Within the stove chamber 9, at the sides and back thereof, is arranged an interior partitioning member 17, constituting the side and rear walls proper of the oven chamber and conformable with the general outline of the corresponding walls of the chamber 9. Between the two sets of walls, there is arranged a coil of pipes 6 adapted to receive its heat from a heater 11 arranged at the bottom of the stove chamber 9 by virtue of damper openings 18 provided at the top and bottom of the partitioning wall 17 and controlled by damper elements 19. The coil of pipe 6 constitutes one of the branches of coils of pipes 5 and 7 indicated in Figs. 3 and 6 and attached by means of piping 3 and 4 to the central reservoir 1. The coil of pipe 5, which can be arranged in a spiral or other desirable form, is placed within the chamber 8 as far removed from the central part of the chamber as possible, in order that a cooking vessel 25 may be placed within the opening of said coil of pipe, sufficient space being allowed between the vessel and the coil of pipe in order that water 31 may be introduced to provide a good conducting medium between the source of heat and the coil of pipe 5 and the cooking vessel just referred to. In a similar manner the coil of pipe 7 is introduced into the chamber 10, but be it noted that the coil of pipe 6 within the oven chamber 9 has its heat transmitted to it from the heater 11 by means of the air circulation passing through the lower damper openings 18 and out again through the upper damper openings 18 in the partitioning wall 17.

The heating unit 11 is made up of a horizontal swinging bracket 12 attached to the interior wall 9 of the stove chamber and upon said bracket is arranged the electrical heating unit 13, best indicated in Fig. 2 of the drawings. Superimposed upon said heating unit, I arrange a slab 15, whether of serpentine, iron or other material, as the case may be. Said heating device 11, although arranged at the bottom of the oven chamber, only partially closes the same to the atmosphere. A considerable advantage follows from this construction, since any moisture that would tend to accumulate in the chamber by virtue of cooking operations therewithin, would tend to be conducted away to the atmosphere, and thereby provide a dry heat necessary for many culinary purposes.

In Fig. 6 the reservoir 1 is indicated as being fed by a street water service 32, leading to the bottom of the reservoir, whereas the pipe 3 led off from the top of said reservoir, has a branch connection 3', which can be used for hot water faucets if desired. Connected between the outlet from the top of the reservoir and the multiple system of piping 5, 6 and 7, I preferably arrange a hot water faucet 29, which because of its proximity to the reservoir would have its temperature at the highest point. On the other hand between the common junction 4 of the connected coils of pipe 5, 6 and 7, just referred to, I arrange a faucet 30 which constitutes a drain tap both for the piping system and for the reservoir generally.

In the drawings, I have indicated that the exterior protecting covering 14 for the cooking elements is integral with the interior protecting walls of the lagging, shown in chambers 8 to 10. This construction, however, can be obviously departed from without in any manner affecting the character of my invention.

In the operation of the device, I aim to take energy from an external source, such as the mains 16 indicated in Fig. 6, to provide heat in the thermal unit 11, located in the stove chamber 9. The heat energy, if provided by a source of electricity, should ordinarily provide for a reduced cost rating by virtue of the fact that an "off peak" service can be made use of for storing heat in the heat reservoir 1. However, should it be found desirable to use electric energy from the mains through a twenty-four hour period, the efficiency of the device would naturally be materially increased by virtue of the fact that a heat reservoir is used in conjunction with a fireless cooking device. Incidentally, what has heretofore been conceived to be a disadvantage of fireless cooking, is by means of my invention obviated, since hot water is made available at all times by virtue of the heat reservoir. The heat energy enters the system through the stove chamber and is controlled in its flow toward the cooking chambers 8 and 10, as well as to the reservoir 1, by means of the dampers 19, controlling the damper openings 18 in the stove chamber walls proper. This contact roll can be made dependent on the temperature if desired.

By providing a swinging bracket 12 which permits of the thermal device 11 being swung out from underneath the stove chamber 9, not only is the temperature conserved within the electric heating and cooking device as a whole, but the said unit 11 can be used for frying purposes or other external uses without in any way interfering with the normal operation of the device. This of itself should constitute a material advantage. On the other hand, ease of accessibility is provided by means of the covers 27 and 28, as well as the oven door 20. Moreover because a heat reservoir is provided in conjunction with a piping system leading to the cooking chambers, inspection of the food cooked can be resorted to, practically as well as in the ordinary cooking operations, where fire is being used. Should the temperature drop a certain number of degrees because of opening the covers 27 and 28, or the oven door 20, the temperatures in the cooking chambers would immediately be recovered because of the considerable quantity of heat stored in the storing reservoir 1, even though the heating device 11 was shut off from communication with the source of energy 16.

By arranging the oven door 20 to swing into a horizontal position by means of the internal hinges 21, the door becomes an external platform, enabling one to slidingly remove any vessel resting on the thermal unit in the oven chamber. However, when the door 20 normally closes the oven, clearance is provided between it and the thermal unit 11, in order that no obstruction is had. By means of the arrangement just described, the inconvenience of lifting hot dishes in a cramped and hot space is entirely avoided.

Instead of filling the tank 1 with water and circulating it through the coils 5, 6 and 7, use may be made of oil or other liquid. The top of the tank 1 is provided with a vent valve 40. The chambers 8 and 10 are preferably provided with drain cocks 50 to drain the chambers of the water whenever desired.

Having now described the nature of my invention, what I claim is:—

1. A cooking apparatus comprising a water reservoir, a plurality of cooking chambers, one of the cooking chambers having a heating unit for heating the same, a piping system between the chambers and connected with the reservoir, and means for regulating the admission of heat from the chamber having the heating unit to the piping system to heat the same.

2. A cooking apparatus, comprising a water reservoir, a plurality of cooking chambers, one of the cooking chambers having a heating unit, and a piping system connected with the reservoir and conducting the heat from the chamber having the heating unit to the remaining cooking chambers.

3. In combination with a water reservoir, a fireless cooker external to said reservoir and having a plurality of cooking chambers, and water conducting means from the reservoir to the cooker comprising a plurality of coils, one for each chamber, said coils being connected with the water reservoir and one of the pipe units of the system being heated electrically.

4. In combination with a heat reservoir, fireless cooking chambers arranged by means of piping in heat conducting relationship therewith, one of the said chambers being provided with a hinged platform means, arranged to form the base of said chamber and having a heat unit thereupon, whereby the platform may be moved away from the walls of the chamber to do external cooking when desired.

5. A fireless cooker having chambers contiguous to an oven chamber, piping connecting the several chambers, a water reservoir with which the piping is connected, a regulatable damper within the oven chamber for controlling the heat conducted to the piping to heat the same, and a heating element within said oven chamber.

6. A fireless cooking element comprising a heat lagged chamber open at the bottom, an oven chamber within the first-named chamber, a heating unit forming the base of the oven chamber, and a damper controlled means for regulating the heat taken from the oven chamber.

7. A fireless cooker comprising a heat lagged chamber open at the bottom, and a heating unit hinged to the chamber, constituting the base of the chamber, for moving the same out from the chamber for external heating when desired.

8. A fireless cooking element comprising a heat lagged chamber having a hinged end wall constituting a door, and a hinged means for holding said door horizontal in alinement with the bottom of the chamber when opened.

9. In combination with a heating chamber open to the atmosphere at the bottom only and adapted for baking purposes, a base member comprising a heating unit to partially close said heating chamber at the bottom, means for regulating the temperature of the heating chamber, and means for removing the heating unit from the chamber.

10. In a fireless cooker, a heating chamber provided with a horizontally swinging bottom member and with a hinged door whose lower end terminates short of the bottom member to permit said member to be swung outwardly under the said door.

11. In combination with a reservoir adapted to contain water, an electrically heated oven, a fireless cooker, and heating coils in the said oven and the said cooker and connected with the said reservoir to circulate the water through the coils.

12. In combination, a reservoir connected with a water supply, an oven attached to the said reservoir and provided with an electric heating element, fireless cookers flanking the said oven, and heating coils in the said oven and the said cookers and connected with the said reservoir.

13. In combination, a reservoir connected with a water supply, an oven attached to the said reservoir and provided with an electric heating element, fireless cookers flanking the said oven, heating coils in the said oven and the said cookers and connected with the said reservoir, and means for controlling the circulation of air in the said oven.

14. A cooking apparatus comprising a water reservoir, a plurality of chambers on the periphery of the reservoir, one of the chambers having double walls, the inner wall having valved openings, a coil of pipe in the space between the walls of the chamber, a coil of pipe in each of the other chambers, the said coils being connected together and connected with the reservoir, and a heater in the chamber having double walls.

15. A heating apparatus, comprising a water reservoir, a plurality of chambers contiguous to the reservoir, one of the chambers having double walls, the inner wall having valved openings, a coil of pipe in the space between the said walls, a coil of pipe in each of the other chambers adjacent to the wall thereof, and a heater in the chamber with double walls, the chamber containing the heater having a hinged door and the other chambers having removable covers.

In testimony whereof I have signed my name to this specification in the presence of two subscribing witnesses.

WALTER WARD ROBERTS.

Witnesses:
C. H. STEFFEN,
E. W. ENKE.